June 11, 1946.    J. N. GLADDEN ET AL    2,401,824
ATTACHMENT FITTING
Filed Dec. 26, 1942

INVENTORS
JOHN N. GLADDEN
LEON ZIELINSKI
BY
HARRIS, KIECH, FOSTER & HARRIS

FOR THE FIRM
ATTORNEYS.

Patented June 11, 1946

2,401,824

UNITED STATES PATENT OFFICE 2,401,824

ATTACHMENT FITTING

John N. Gladden and Leon Zielinski, Glendale, Calif.

Application December 26, 1942, Serial No. 470,288

19 Claims. (Cl. 85—32)

Our invention relates to fastening devices, with special reference to fittings for connection to sheets or plates. For the purpose of the present disclosure we elect to describe the invention as embodied in a fitting for releasably connecting inspection plates and other objects to the skin of an airplane. It will be obvious that the invention may have other embodiments for other purposes.

Since the sheet material comprising the skin of an airplane is relatively thin and since an object, such as an inspection plate, must be detachable, it is common practice to mount on the skin sheet suitable fittings having threads engageable by screws or other attachment means. The manufacture of such fittings commonly involves several machine operations and in the aggregate consumes considerable metal.

It is desirable, especially so in wartime, to reduce both the manufacturing cost of the fittings and the amount of metal required. One object of our invention is to provide an attachment fitting of this type that may be manufactured inexpensively with minimum operations requiring machine tools. Another object is to provide a fitting construction that lends itself readily to the substitution of non-metallic material for metal in a substantial portion of the fitting, and is light in weight.

An attachment fitting of the present type has a base surface for contact with the skin sheet of the airplane. Since the fitting is usually made of relatively rigid material and since the skin sheet of the airplane is relatively flexible, the skin sheet tends to conform to the surface configuration of the fitting base. Since the base surface is flat, and more often than not the skin sheet of an airplane has a normal curved configuration, mounting of the fitting usually causes undesirable local distortion and undesirable local stress in the skin sheet. A further object of our invention is to provide a flexible or deformable fitting so that the base surface of the fitting may be readily formed to the normal configuration of the skin sheet, thereby to avoid unnecessary local stress in the skin sheet.

Since the skin of an airplane is subject to vibration, it is desirable to incorporate in such a fitting construction some expedient to resist loosening of the associated screw means. It is a further object of our invention, therefore, to provide such an expedient in a simple and inexpensive manner.

Our invention is characterized by the concept of using separate materials for the base portion and the screw-engaging portion of the attachment fitting whereby materials best suited for the respective functions of the two portions may be used. A number of objects of our invention have reference to the selection of such materials and the manner in which the two materials are structurally related. Such objects include the following: to provide a construction permitting the use of tough material such as metal for the screw-engaging portion and non-metallic material of different properties for the base portion; to provide a construction in which the screw-engaging portion is mounted in the material of the base portion, the latter being a base member and the former being an insert embedded in the base member; to provide for embedding such an insert in a manner to prevent either relative rotation or relative axial movement of the insert; to provide a construction in which the screw loads are transmitted directly to the insert with little or no stress imposed on the base member; to provide such a dual-part construction in which the base member is made of pliable or deformable non-metallic material to readily conform to any particular skin sheet, even a skin sheet curved in more than one direction; to provide such a construction in which the material of the base member coacts with the screw means to resist loosening of the screw means; and to provide such a construction in which the deformability of the base material is such as to serve a dual purpose, first, in permitting the base member to be flexed to the particular local curvature of a skin sheet, and, second, in permitting displacement or penetration of the material of the base member by threaded means, thereby to provide such intimate contact with the threaded means as to resist loosening under vibration.

The above and further objects and advantages of our invention will be apparent in the following detailed description, taken with the accompanying drawing.

In the drawing, which is to be considered as illustrative only:

Figure 1:
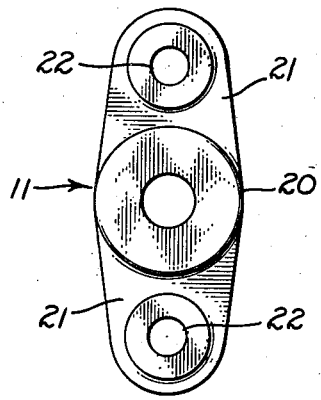
Fig. 1 is a plan view of a preferred form of our fitting.
Figure 2:
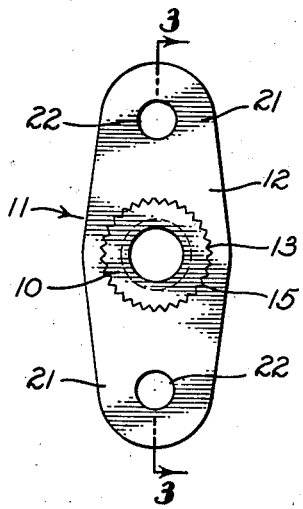
Fig. 2 is a bottom view of the fitting.

The fitting shown in the drawing comprises an insert 10 embedded in a base member generally designated 11 which as shown constitutes a housing for the insert 10. The insert 10 is made of suitably tough material and may, for example, be made of metal. The base member 11 may be made of any moldable non-metallic material having suitable properties. Thus, the base member may be molded from various plastics including ethyl-cellulose, cellulose acetate, etc. Preferably, but not necessarily, the insert 10 is flush with the bottom or base surface 12 of the base member 11 so that the insert in effect provides a portion of the base surface.

It is desirable to embed the insert 10 in the material of the base member 11 in such manner as to prevent relative rotation of the base member. For this purpose the insert 10 may be formed with a broken peripheral surface for positive engagement by the surrounding material of the base member to prevent relative rotation. Thus, in the present construction the insert 10 is serrated to provide numerous longitudinal recesses 13 forming numerous longitudinal shoulders 15 for engagement with the surrounding material.

Figure 3:
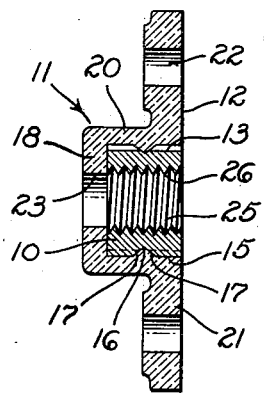
Fig. 3 is a sectional view of the fitting taken as indicated by the line 3—3 of Fig. 2.
Figure 4:
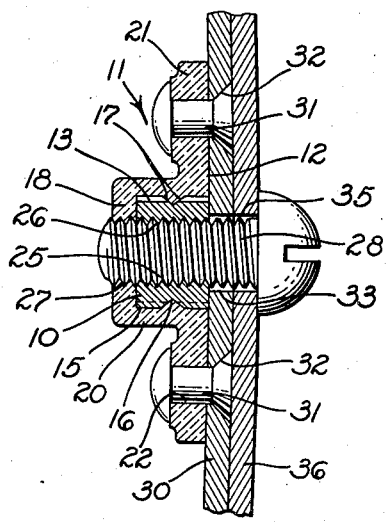
Fig. 4 is a similar sectional view of the fitting as employed to attach an object to a skin sheet.

It is also desirable to provide means for interlocking the insert 10 and the base member 11 in a manner to prevent relative axial movement of the insert. Thus, in the present construction the insert 10 has an annular groove 16 forming two shoulders 17 for positive engagement with the surrounding material of the base member to prevent relative axial movement of the insert. For the same purpose the base member 11 may have a flange portion 18 overlapping an end surface of the insert to prevent axial movement of the insert relative to the base member in a direction away from the skin sheet when the fitting is mounted on a skin sheet, as shown in Figs. 3 and 4. It will be noted that the material of the base member 11 forms the annular flange 18 which engages the end of the insert 10 in a positive manner to prevent such relative axial movement.

The base member 11 has a housing portion 20 embracing and embedding the insert 10 and has at least one laterally extending portion integral therewith adapted for attachment to a skin sheet. In the present construction there are two such lateral portions in the form of wings 21, the two wings having suitable bores 22 to facilitate mounting of the fitting.

Preferably the deformability or flexibility of the material of the base member 11 is such as to permit the wing portions 21 to be curved in whatever manner may be required to conform with the configuration of the skin sheet. We have found that some materials of such properties, for example, ethyl cellulose and cellulose acetate, may be depended upon additionally to cooperate with the screw means in a novel manner, the screw means serving as a tool to form threads in the material of the base member. In this regard note that in Fig. 3 the annular flange 18 of the base member defines a plain aperture 23 at the remote or outlet end of the threaded bore 25 of the insert, the aperture being of a diameter smaller than the maximum diameter of the thread 26 in the bore and likewise smaller in diameter than the outside diameter of the thread 27 on the screw 28 shown in Fig. 4.

Fig. 4 shows the fitting mounted on the inner side of a skin sheet 30 of an airplane, the fitting being secured by suitable rivets 31 that pass through corresponding attachment holes 32 in the skin sheet. The threaded bore 25 of the insert 10 has an entrance end which registers with an attachment opening 33 in the skin sheet 30 and a substantially coaxial attachment opening 35 in an inspection plate 36. When the screw 28 is inserted in the insert 10 and tightened down to the final position shown in Fig. 4, it is apparent that the screw serves as a tool to cut a thread in the cylindrical wall of the aperture 23 formed by the flange 18 of the base member 11. The additional thread formed by the screw in the aperture 23 in the base member 11 cooperates with the thread 26 of the insert bore 25 to resist axial retraction of the screw 28, and the additional thread in the aperture also makes such intimate frictional contact with the screw as to resist rotational retraction of the screw under vibration.

It will be noted in Fig. 4 that the tightening of the screw 28 draws the insert 10 into pressural contact with the inner surface of the skin sheet 30 so that loads imposed on the screw are transmitted directly to the skin sheet without necessarily being transmitted to or through the material of the base member 11. It will be further noted in Fig. 4 that the skin sheet 30 is curved in the plane defined by the axes of the two rivets 31 and that the fitting corresponds to this curvature. In like manner the fitting will conform to any lateral curvature in a perpendicular plane defined by the axis of the screw 28.

Such a fitting may be manufactured at relatively low cost, since the machining operations are confined to fabrication of the insert 10, the base member 11 being simply molded around the insert in any suitable manner. Such a fitting will also give a maximum of service for a minimum of weight.

Our disclosure in specific detail of the preferred embodiment of our invention suggests various changes and substitutions that may be made under our basic concept, and we reserve the right to all such changes and substitutions that properly lie within the scope of our appended claims.

We claim as our invention:

1. A fitting of the character described for connecting threaded members to objects of various surface curvature, comprising: a body of tough material having a threaded bore to receive one of said threaded members; and a molded base member having a portion embedding said body and at least one lateral portion for attachment to a curved object, said base member being of deformable plastic material to permit said lateral portion to conform to various surface curvatures, said plastic base having an aperture located for threaded engagement of one of said threaded members therein and having a sufficiently smaller diameter than the outside diameter of said threaded member for accomplishment of said threaded engagement by deformation of the plastic wall of said aperture.

2. A fitting of the character described for connecting a threaded member to an object, comprising: a body of tough material having a threaded bore provided with an entrance end to receive said threaded member; and a base of plastic material embracing said body and adapted for attachment to said object, said base member overlapping the end of said body remote from said entrance end to resist axial movement of the body relative to the base member, said plastic base having an aperture located for threaded engagement of said threaded member therein and having a sufficiently smaller diameter than the outside diameter of said threaded member to accomplish said threaded engagement by deformation of the plastic material surrounding said aperture.

3. A fitting of the character described for connecting a threaded member to an object, comprising: a body of tough material having a threaded bore provided with an entrance end to receive said threaded member; and a base member of plastic material embedding said body and adapted for attachment to said object, said body having a broken peripheral surface to resist rotation of the body relative to the base member, said base member overlapping the end of said body remote from said entrance end to resist axial movement of the body relative to the base member, said plastic base having an aperture located for threaded engagement of said threaded member therein and having a sufficiently smaller diameter than the outside diameter of said threaded member to accomplish said threaded engagement by deformation of the plastic material surrounding said aperture.

4. A fitting of the character described for connecting threaded members to objects of various surface curvature, comprising: a body having a threaded bore to receive said threaded member; and a base member adapted for attachment to said object, said base member embedding said body and providing an aperture at one end of said bore smaller in diameter than the outside diameter of said threaded member, the material of said base member being deformable whereby said threaded member may form a thread in said aperture and whereby the base member may be readily deformed to a surface curvature of said object.

5. A fitting according to claim 4 wherein the threaded bore has an entrance end to receive the threaded member and a remote end through which said threaded member projects, said aperture of said smaller diameter in said base member being at said remote end.

6. A fitting of the character described for engagement by a threaded member to connect something to the outer side of a wall having attachment holes, said fitting comprising: a body of tough, substantially non-yielding material having a threaded bore to register with one of said attachment holes from the inner side of said wall for engagement by said threaded member; and a base member having at least one lateral portion to underlie another of said attachment holes and having an aperture to register with said other hole for anchorage to said wall, said base member being of deformable plastic material to permit said lateral portion to conform to varying surface curvatures, and said base member embracing said body, said body having at least one shoulder engaged by said base member to resist axial movement relative to the base member.

7. A fitting of the character described for engagement by a threaded member to connect something to the outer side of a wall having attachment holes, said fitting comprising: a body of tough material having a threaded bore to register with one of said attachment holes from the inner side of said wall for engagement by said threaded member; and a molded base member of plastic having at least one portion to underlie one of said attachment holes for anchorage to said wall, said base member embedding said body, said body having at least one longitudinally positioned peripheral recess for engagement with said base member to resist rotation relative thereto and having at least one circumferentially positioned recess for engagement with said base member to resist axial movement relative thereto.

8. A fitting of the character described for engagement by a threaded member to connect something to the outer side of a wall having attachment holes, said fitting comprising: a body of tough material to contact the inner side of said wall, said body having a threaded bore to register with one of said attachment holes for engagement by said threaded member to resist outward movement of the threaded member relative to the wall; a base member having at least one portion to underlie one of said attachment holes for anchorage to said wall, said base member embracing said body, said body having a broken peripheral surface for engagement with said base member to resist rotation relative to the base member, said body providing at least one shoulder in engagement with said base member to resist axial movement relative to the base member.

9. A fitting of the character described for connecting threaded members to walls of various curvature, comprising: a body of tough material having a threaded bore to receive said threaded member; and a base member having a portion embedding said body and at least one wing portion for attachment to said wall, said body having a broken peripheral configuration to resist rotation of the body relative to the base member, said base member being fabricated from deformable plastic material to permit said wing portion to conform to various wall curvatures, said plastic base having an aperture located for threaded engagement of said threaded member therein and having a sufficiently smaller diameter than the outside diameter of said threaded member to accomplish said threaded engagement by deformation of the plastic material surrounding said aperture.

10. A fitting of the character described for connecting threaded members to walls of various curvature, comprising: a body having a threaded bore to receive said threaded member; and a base member having a portion embedding said body and at least one lateral wing portion for attachment to a wall, said body having a broken peripheral surface to resist rotation of the body relative to the base member, said body providing at least one shoulder to resist axial movement of the body relative to the base member, said base member having an aperture at one end of said threaded bore of smaller diameter than the outside diameter of the threads in said threaded members, said base member being fabricated from deformable material to permit said wing portion to conform to various wall curvatures and to permit a threaded member inserted in the fitting to form threads in said aperture.

11. A fitting according to claim 10 wherein the threaded bore of the body has an entrance end to receive said threaded member and an outlet end through which the end of said threaded member projects, said aperture of smaller diameter than the outside thread diameter being positioned at said outlet end.

12. A fitting of the character described for engagement by a threaded member to connect something to the outer side of a curved wall having attachment holes, said fitting comprising: a body of tough material having a threaded bore to register with one of said attachment holes for engagement by said threaded member; and a base member having at least one portion to underlie another of said attachment holes for anchorage to the wall, said base member embedding said body, said body having at least one shoulder engaged by the base member to resist rotation relative to the base member and at least one shoulder engaged by the base member to resist axial movement relative to the base member, said base member being of deformable plastic material to permit said one portion to conform to a wall curvature.

13. A fitting of the character described for engagement by a threaded member to connect something to the outer side of a curved wall having attachment holes, said fitting comprising: a body having a threaded bore to register with one of said attachment holes from the inner side of said wall for engagement by said threaded member; and a base member having at least one portion to underlie another of said attachment holes for anchorage to said wall from the inner side of the wall, said base member embracing said body, said body having a broken peripheral surface for engagement with said base member to resist rotation relative to the base member, said base member overlapping the end of said body to resist axial movement of the body relative to the member away from the inner face of the wall, said member having an aperture at one end of said threaded bore of smaller diameter than the outer diameter of the threads of said threaded member, said base member being of deformable material whereby the base member may conform to the wall curvature and whereby threads may be formed in said aperture by said threaded member to resist loosening of the threaded member.

14. A fitting according to claim 13 wherein the portion of the base member overlapping the end of the threaded body contains the aperture of smaller diameter than the outer thread diameter.

15. In combination: a body having a threaded bore to receive a threaded member; a housing of deformable material peripherally surrounding said body and having a flange overlying one end of said body, said flange having a cylindrical-walled aperture at the corresponding end of said bore and aligned therewith, said aperture being adapted to receive said threaded member but having a sufficiently smaller diameter than the outside diameter of the threads of said threaded member for said member to cut a thread in the cylindrical wall of said aperture; and means locking said housing against movement relative to said body, said locking means including means to prevent relative axial movement of said body and housing.

16. A fitting of the character described and adapted to receive a threaded member, comprising: a metallic body providing a threaded bore having an entrance end adapted to receive said threaded member and an exit end from which said threaded member is adapted to extend; a base member providing a housing portion having a cavity to receive said body, said housing portion peripherally surrounding said body, said base member providing also at least one wing portion extending outwardly from said housing portion; interengaging means for preventing rotation of said body in said cavity of said housing portion; and a ring of deformable material retained by said housing portion adjacent that end of said body which is at the exit end of said bore, said ring providing an aperture aligned with said threaded bore and of such diameter as to receive said member, the diameter of said aperture being sufficiently smaller than the outside diameter of said threaded member to cause said deformable material to bind said threaded member by deformation of said material upon entry of said threaded member into said aperture.

17. In combination: a body having a threaded bore to receive a threaded member; a housing provided with a laterally extending member adapted to be attached to an object, said housing being formed of deformable material peripherally surrounding said body and having a flange overlying one end of said body, said flange having a cylindrical-walled aperture at the corresponding end of said bore and aligned therewith, said aperture being adapted to receive said threaded member but having a sufficiently smaller diameter than the outside diameter of the threads of said threaded member for said member to cut a thread in the cylindrical wall of said aperture; and means locking said housing against movement relative to said body.

18. In combination: a body having a threaded bore to receive a threaded member; a housing of deformable material peripherally surrounding said body and having a flange overlying one end of said body, said flange having a cylindrical-walled aperture at the corresponding end of said bore and aligned therewith, said aperture being adapted to receive said threaded member but having a sufficiently smaller diameter than the outside diameter of the threads of said threaded member for said member to cut a thread in the cylindrical wall of said aperture, said body having an exposed bearing surface at one end of said bore, and said housing entirely surrounding said body peripherally and providing an exposed bearing surface whereby both of said bearing surfaces engage an object to which said parts are attached; and means locking said housing against movement relative to said body.

19. A fitting of the character described for engagement by a threaded member to connect something to the outer side of a wall having attachment holes, said fitting comprising: a body of tough, substantially non-yielding material having a threaded bore to register with one of said attachment holes from the inner side of said wall for engagement by said threaded member; and a base member having at least one lateral portion to underlie another of said attachment holes and having an aperture to register with said other hole for anchorage to said wall, said base member being of deformable plastic material to permit said lateral portion to conform to varying surface curvatures, and said base member embracing said body, said body having at least one shoulder engaged by said base member to resist rotation relative to the base member.

JOHN N. GLADDEN.
LEON ZIELINSKI.